(12) United States Patent
Griesemer et al.

(10) Patent No.: US 6,334,629 B1
(45) Date of Patent: Jan. 1, 2002

(54) HEIGHT ADJUSTMENT MEANS FOR SAFETY BELT DEFECTOR FITTINGS OF VEHICLES

(75) Inventors: Albert Griesemer, Dorfwiese 3, D-56457 Westerburg; Else Kreim, Büttelborn, both of (DE)

(73) Assignee: Albert Griesemer, Westerburg (DE)

( * ) Notice: Subject to any disclaimer, the term of this patent is extended or adjusted under 35 U.S.C. 154(b) by 0 days.

(21) Appl. No.: 09/254,878

(22) PCT Filed: Jul. 30, 1998

(86) PCT No.: PCT/DE98/02177
§ 371 Date: Sep. 24, 1999
§ 102(e) Date: Sep. 24, 1999

(87) PCT Pub. No.: WO99/06247
PCT Pub. Date: Feb. 11, 1999

(30) Foreign Application Priority Data

Jul. 31, 1997 (DE) ..................................... 297 13 642 U

(51) Int. Cl.$^7$ ............................................. B60R 22/20
(52) U.S. Cl. ..................................... 280/801.2; 280/804
(58) Field of Search ........................... 280/801.2, 801.1, 280/804

(56) References Cited

U.S. PATENT DOCUMENTS

| 4,569,537 | A | | 2/1986 | Else | ........................ 280/801.2 |
|---|---|---|---|---|---|
| 4,640,550 | A | * | 2/1987 | Hakansson | ................... 297/483 |
| 4,786,081 | A | * | 11/1988 | Schmidt | ..................... 280/808 |
| 5,044,666 | A | * | 9/1991 | Griesemer | ................... 280/808 |
| 5,366,243 | A | * | 11/1994 | Ray et al. | ................. 280/801.2 |
| 5,460,410 | A | * | 10/1995 | Petzi et al. | .............. 280/801.2 |
| 5,908,205 | A | * | 6/1999 | Griesemer | ............... 280/801.2 |
| 5,931,502 | A | * | 8/1999 | Frank et al. | ............. 280/801.2 |

FOREIGN PATENT DOCUMENTS

| DE | 32 25 862 | 1/1984 |
|---|---|---|
| DE | 3431678 | 8/1985 |
| DE | 85 30 629 | 5/1986 |
| DE | 297 01 481 | 5/1997 |
| EP | 0 376 320 | 7/1990 |

* cited by examiner

*Primary Examiner*—Donald P. Walsh
*Assistant Examiner*—J. Allen Shriver
(74) *Attorney, Agent, or Firm*—Pillsbury Winthrop LLP

(57) ABSTRACT

A height adjuster adapted to remain latched during a side-on collision includes a guide rail having a U-shaped cross section, an adjusting part displaceable in the guide rail, an arresting mechanism for the adjusting part moveable in a longitudinal direction, a blocking part, for arresting the adjusting part and penetrating latch openings of the guide rail and an elastic member which biases the blocking part into the latch openings of the guide rail.

22 Claims, 9 Drawing Sheets

Figure 1:
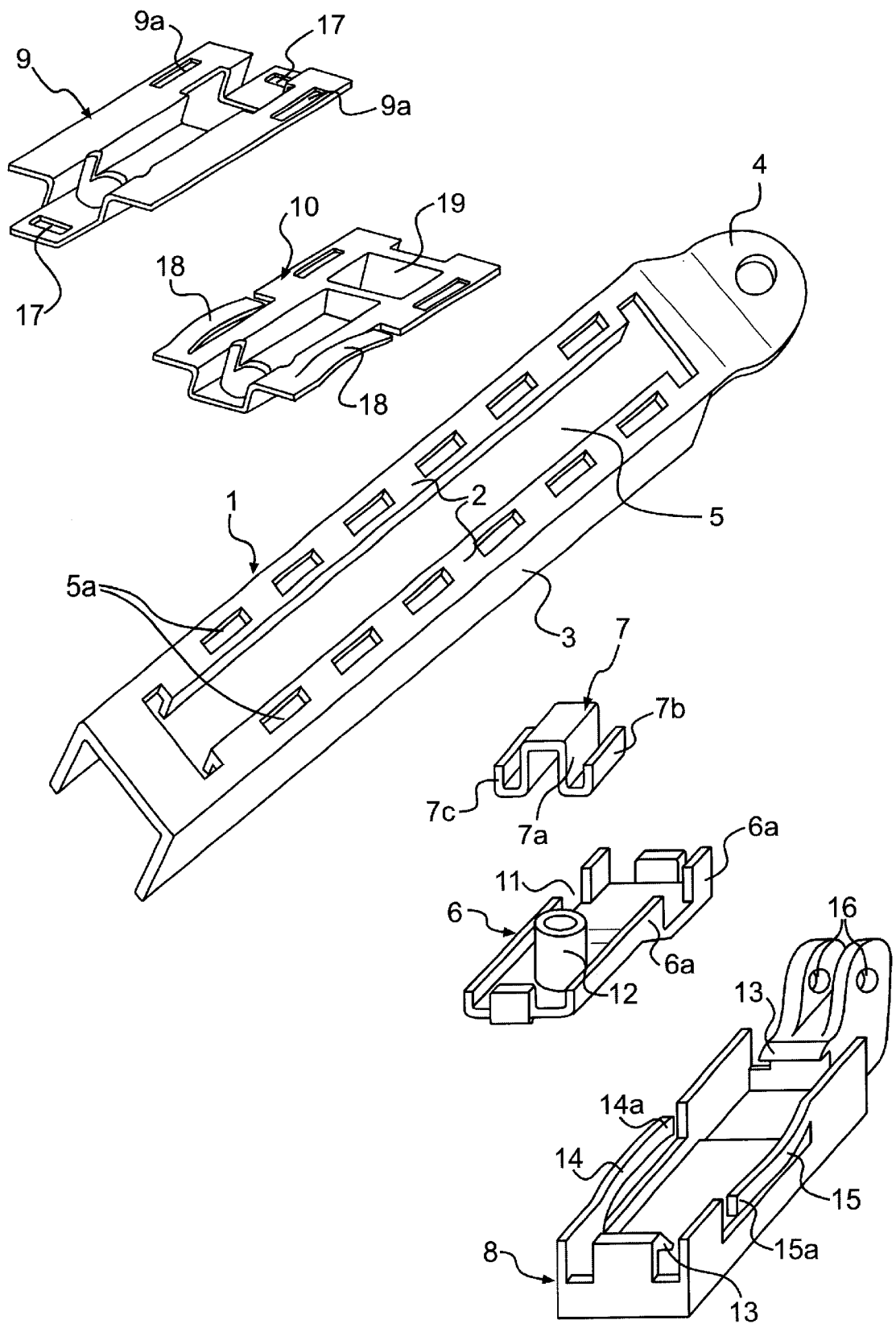

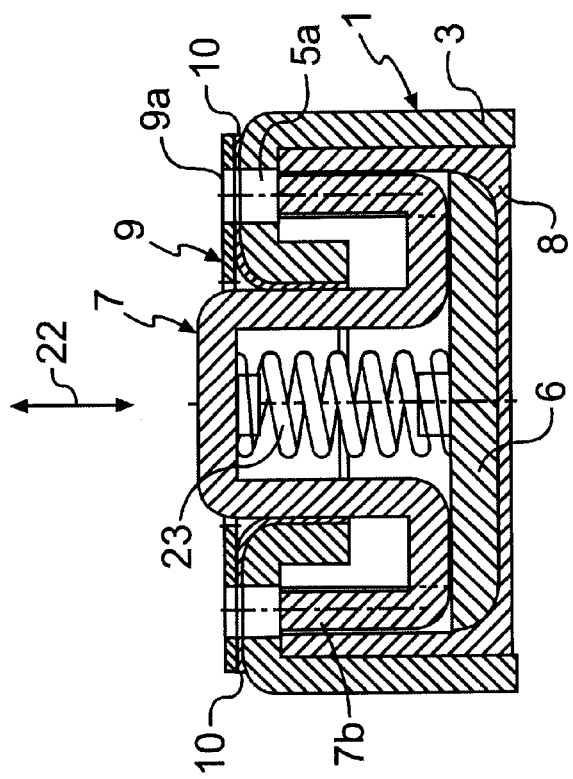
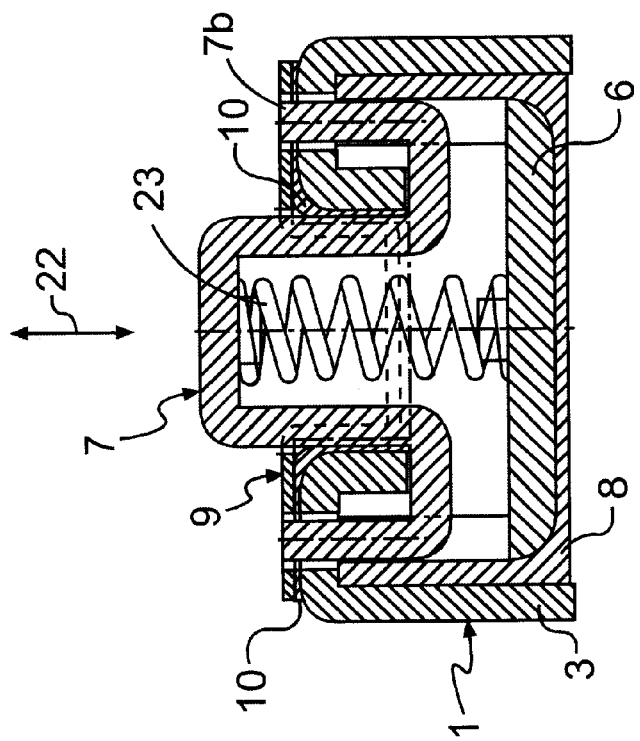
FIG. 4a
FIG. 4b

HEIGHT ADJUSTMENT MEANS FOR SAFETY BELT DEFECTOR FITTINGS OF VEHICLES

This application is the national phase of international application PCT/DE/98/02177 filed Jul. 30, 1998 which designated the U.S.

TECHNICAL FIELD

The invention concerns a height adjuster for return fixtures of vehicle safety belts.

STATE OF THE ART

Height adjusters of this kind are known in a variety of embodiments. In general this consists of the arresting mechanism with the latching lugs formed on the adjusting part which can engage in a form-locking manner in the latch openings of the guide rail. To release, the adjusting part is pressed towards the inside of the guide rail, i.e. as a rule over a support edge. The opposite movement then results in the renewed latching in. These movements require a considerable exposed space between the underside of the adjusting part and the topside of the B or C pillars of the vehicle against which rest the legs of the guide rail when fitted. This exposed space with its possibility for movement for the adjusting part has shown itself be a danger zone in the event of a side-on impact, as this can lead to the unintended release of the adjusting part and the latching into the lowest end position, causing the intended holding and safety function to be lost. Of significance in this case also is the fact that the entire adjusting part has a considerable mass (for example in the region of 70 g) which is subjected to the acceleration. In connection with the existing exposed space it is possible therefore in unfavourable situations for the known systems or embodiments to unlatch. In this respect the known height adjusters lag behind the constantly rising safety requirements.

STATEMENT OF THE INVENTION

The present invention provides a height adjuster of the type mentioned in such a way that it retains the selected latching position even in the event of a side-on collision.

This aim is achieved by means of the features of claim 1. Advantageous further developments are disclosed in the sub-claims.

As can be seen, the actual adjusting part can be so limited in its movement that it can only be displaced longitudinally. A dangerous exposed space, as is required for making a swivel movement required for latching in and out, is thus already avoided. Instead, only a small and light-weight part, which is picked up by the adjusting part in the longitudinal direction, is to be given an additional movement, namely perpendicular to the direction of movement of the adjusting part. This allows the blocking part for arresting to engage in the latch openings and also to be released from these again, wherein now—different as in the case of a swivel movement over a supporting edge—it covers only a short distances, namely in the range of the depth of the latch openings, which equals the material thickness of the guide rail. Less of a risk too is the substantially lighter mass (below 10 g) of the blocking part, movable alone more for the purpose of arresting.

As a result, in the event of a side-on crash there is provided a high degree of blocking safety, and this with a more simple construction. Further advantageous embodiments regarding safety are contained in the sub-claims. With the additional features it is also possible to improve the slideability, to reduce noise and to produce convenient assembly units (modules), as well as to counter any other dangers, especially serious injuries in the case of a head impact.

SHORT DESCRIPTION OF THE DRAWING

Figure 2:
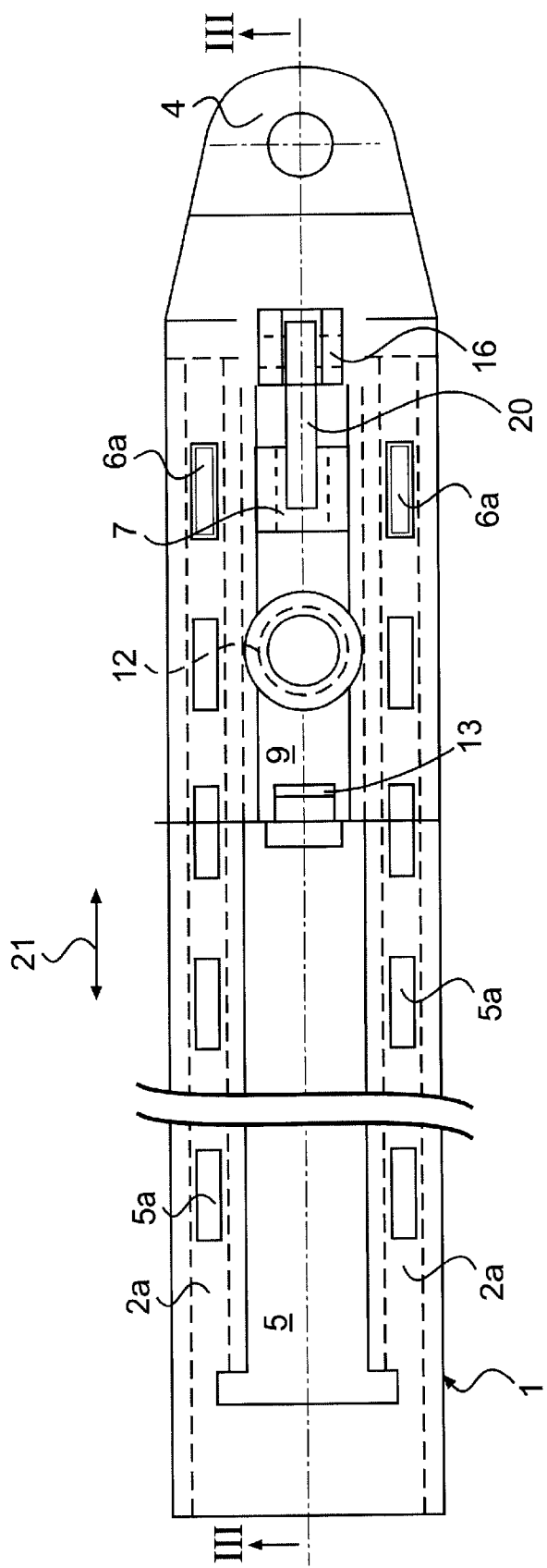
Figure 3:
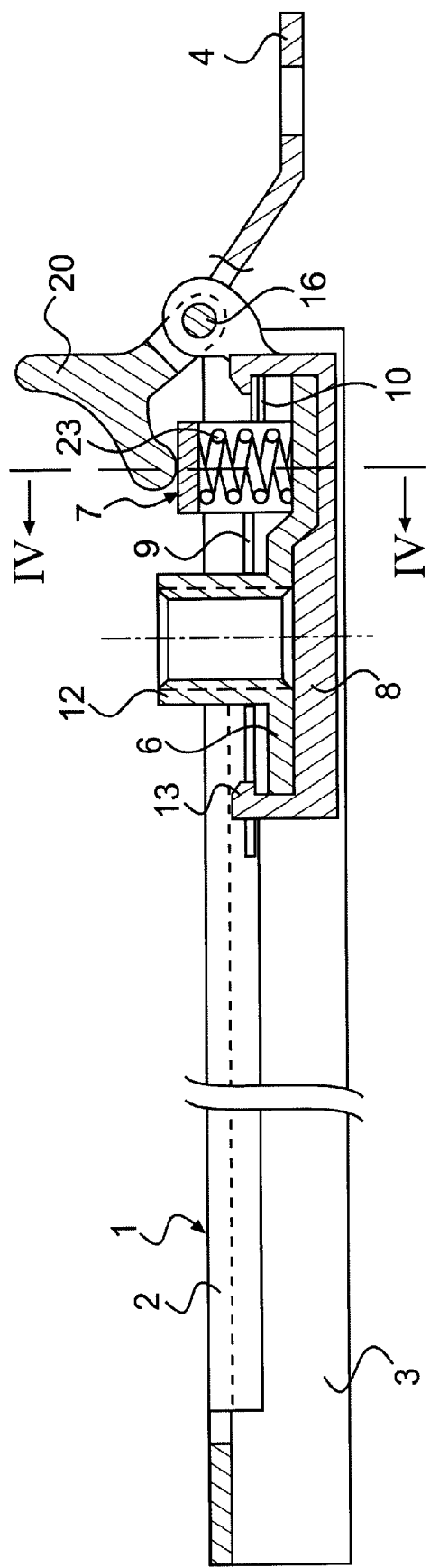
Figure 5:
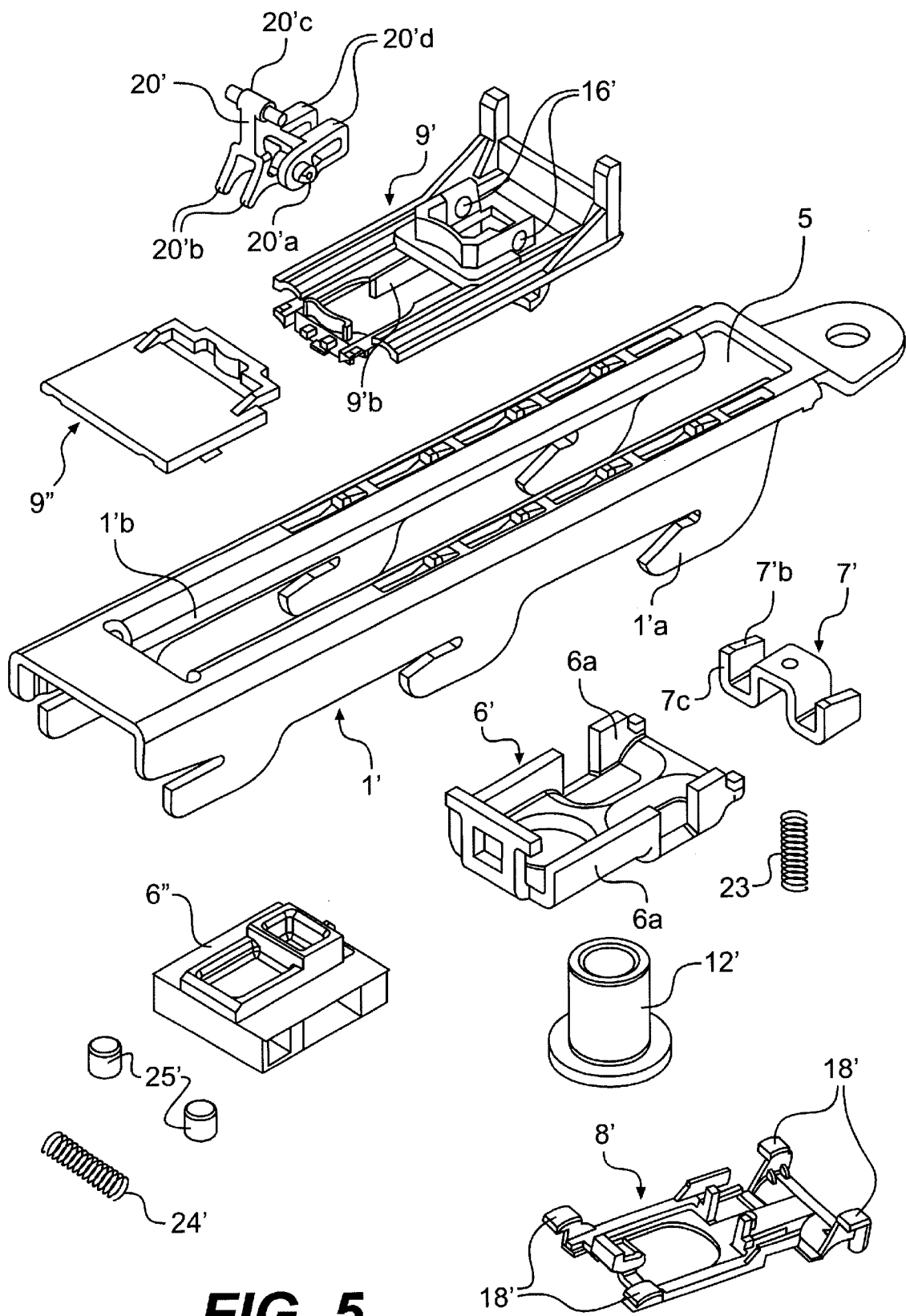
Figure 6:
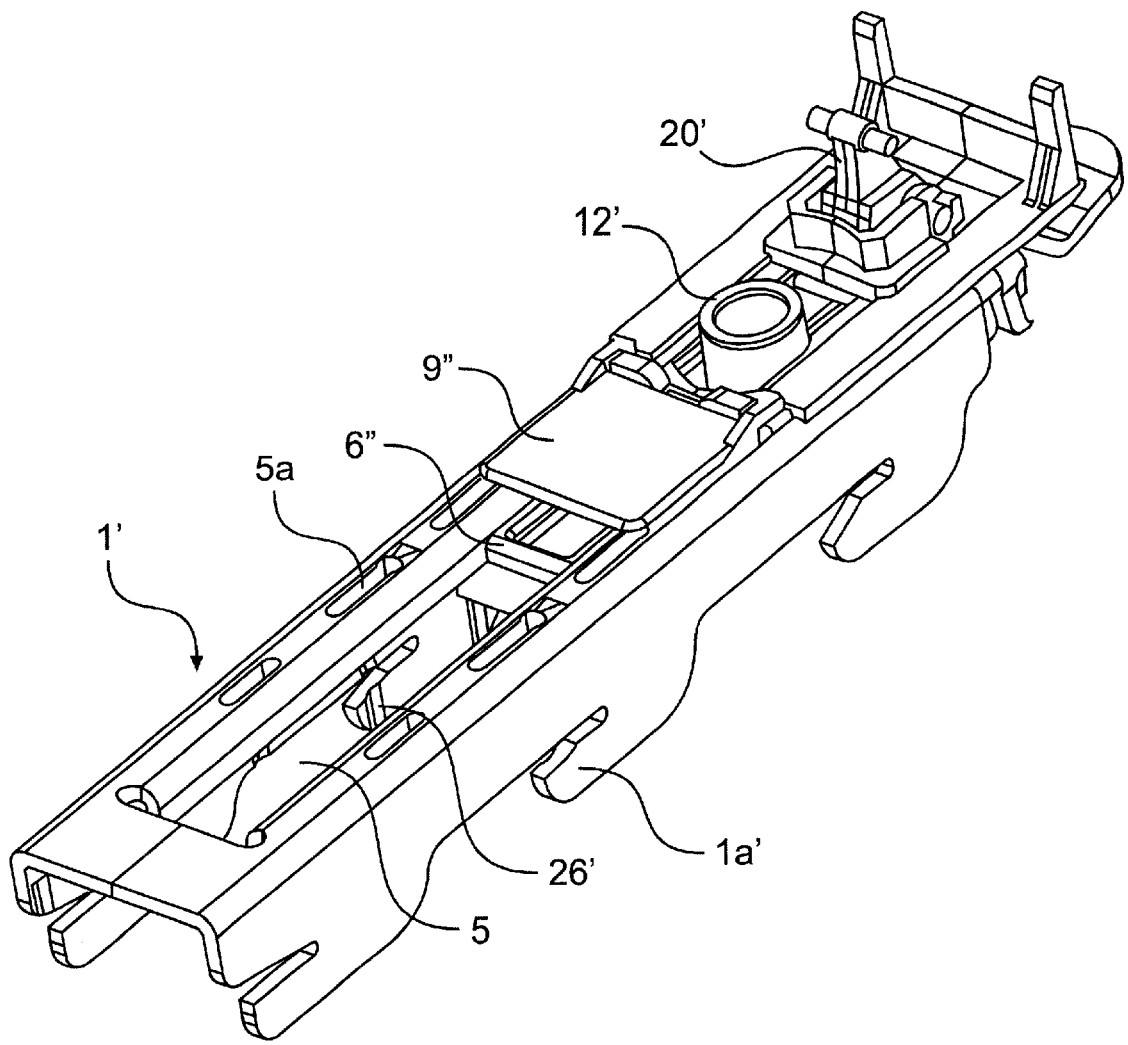
Figure 7:
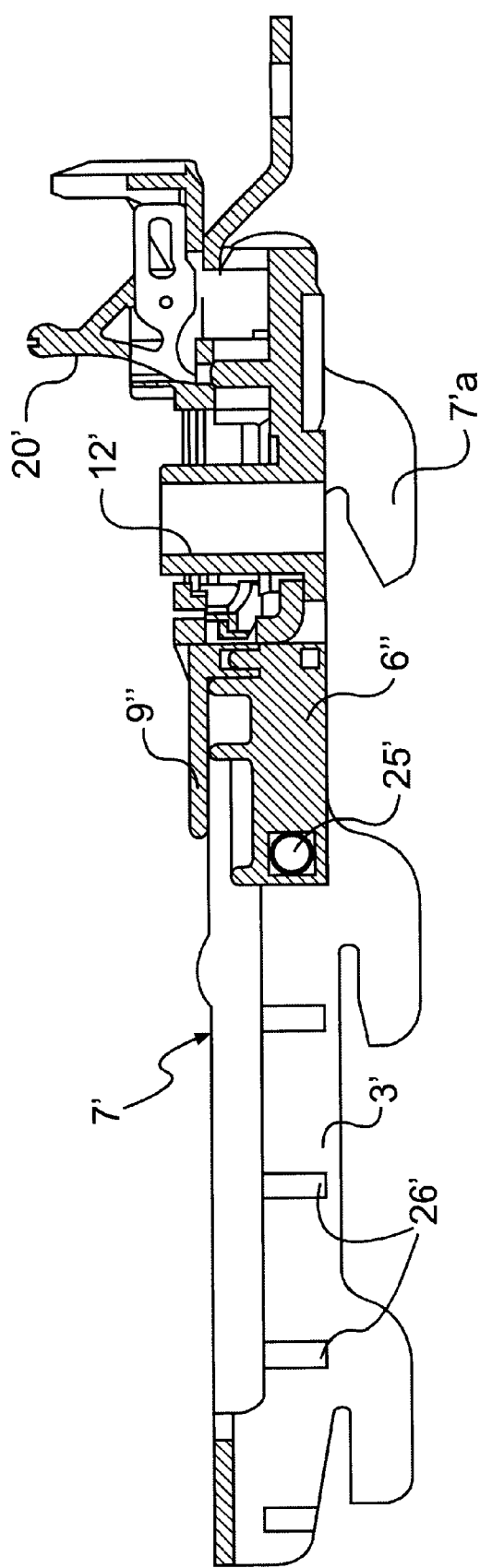
Figure 8:
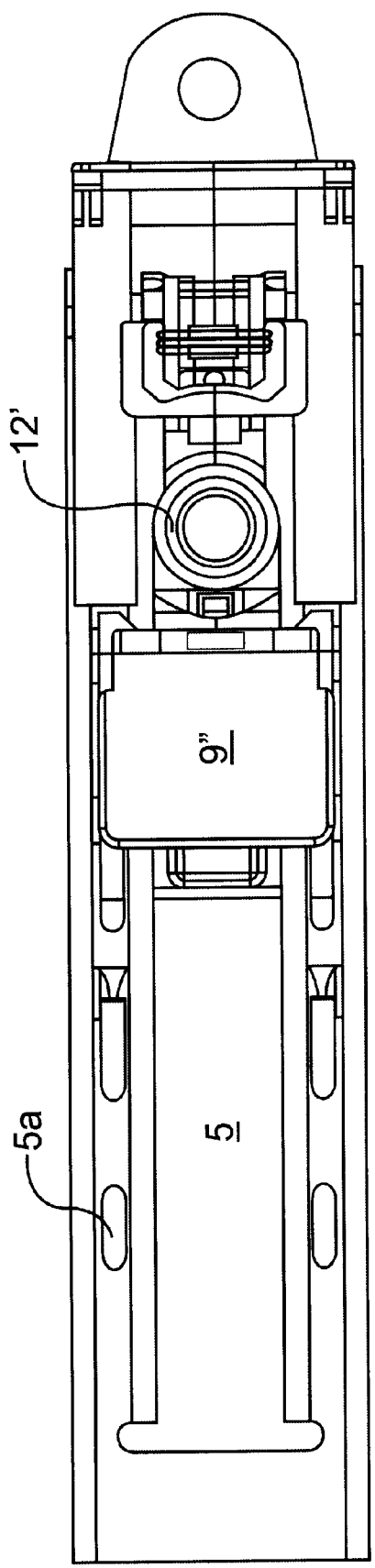
Figure 9A:
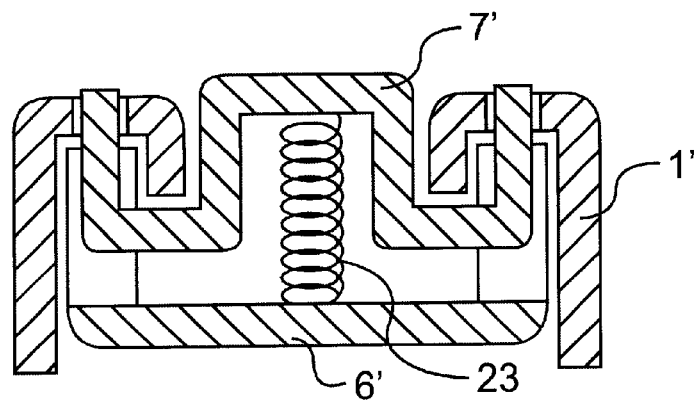
Figure 9B:
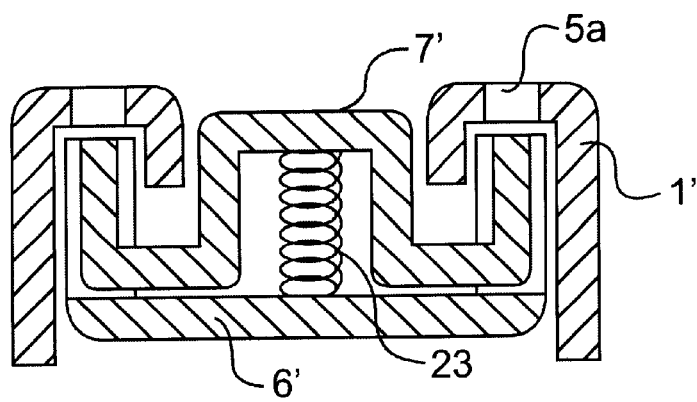
Figure 10:
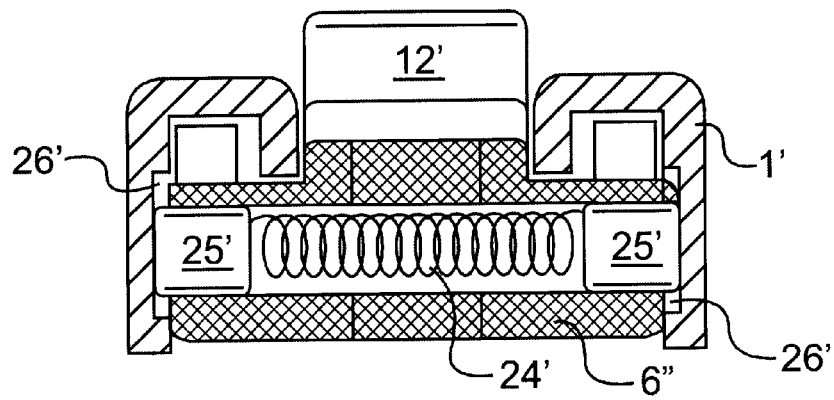

Further details and advantages are described in the following with the aid of the drawing for a preferred embodiment. These show:

FIG. 1 an exploded view of the individual parts of a height adjuster shown in perspective view, FIG. 2 a plan view of an assembled height adjuster, FIG. 3 the height adjuster of FIG. 2 in longitudinal section along line III—III, FIG. 4a simplified the height adjuster of FIG. 3 in section along line IV—IV, in the arresting position, FIG. 4b the same object in the displacement position, FIG. 5 an exploded view of the individual parts of a different height adjuster shown in perspective, FIG. 6 the assembled height adjuster of FIG. 5, also shown in perspective, FIG. 7 the height adjuster of FIG. 6 in longitudinal section, FIG. 8 a plan view of the height adjuster of FIG. 6, FIG. 9a simplified the height adjuster of FIG. 6 at the level of its blocking part in cross-section, in the arresting position, FIG. 9b the same object in displacement position and FIG. 10 simplified the height adjuster of FIG. 6 at the level of its latching pins in cross-section, in the latching position.

According to FIG. 1 a height adjuster for the return fixture of a safety belt initially consists of a U-shaped guide rail 1 (in cross-section) with a central region 2 and arms 3 projecting away from the same at right angles. For securing this to (a B or C pillar of a vehicle) the guide rail 1 has an angled end piece 4 containing a drilling. In the central region 2 it furthermore has an elongated recess 5 as well as latch openings 5a arranged in pairs thereto.

With the guide rail 1 cooperate the following further parts: an adjusting part 6, a blocking part 7, a plastics cage 8, which are all to be arranged inside, as well as a locking plate 9 and a plastics slider 10, which are to be arranged on the outside. The adjusting part 6 has raised edges 6a, especially in the longitudinal direction. These are partly perforated, simultaneously forming a guide 11 and a support for the blocking part 7. The adjusting part 6 also carries a threaded bush 12 for a return fixture (not shown). The blocking part 7 in this case is constructed basically as a U-shaped bracket 7a whose arm is further bent in U-shape in the opposite sense. The exposed arms or ends 7b represent latching lugs which are fitted with their front ends 7c in the guide 11 of the adjusting part 6.

The adjusting part 6 together with the blocking part 7 can be inserted in the plastics cage 8 which has latching lugs 13 on its narrow sides and slide springs 14, 15 on its longitudinal sides. The exposed ends 14a, 15a of the slide springs 14, 15 point in opposite directions. A bearing 16 for an adjusting lever is additionally formed on one narrow side.

Holding and closing the plastics cage 8 is served by the locking plate 9 which is to be fitted externally to the guide rail 1 and matches the shape of the guide rail 1, i.e. the locking plate 9 has lateral regions which brush over the latch openings 5a, and a central region which is lowered into the elongated recess 5 of the guide rail 1. In the latter are located recesses 17 for the latching lugs 13 of the plastics cage 8 for forming a releasable clip connection.

The locking plate 9 also has a pair of latch openings 9a which, in the arresting position, mate with a pair of latch openings 5a of the guide rail 1 and can additionally receive the ends 7b of the blocking part 7 (see FIG. 4a, b). Also provided is a corresponding recess for the blocking part 7 as well as the threaded bush 12.

The plastics slider 10 finally has a similar form (together with recesses) as the locking plate 9. In contrast to this, it is slightly shorter and has moulded-on slide springs 18 which are active between the lateral regions of the locking plate 9 and the central region 2 of the guide rail 1. Furthermore, in the region of the recess for the blocking part 7 there is provided a channel section 19 for the better guidance of the blocking part 7. When locking plate 9 and plastics cage 8 are clipped together, the plastics slider 10 is readily held in-between, just as the other movable parts are securely held and supported. An assembly unit or a function module is formed so to speak.

The FIGS. 2 and 3 show the assembled height adjuster which in this case is even provided for completeness with an operating lever, i.e. release or adjusting lever 20. By means of this lever 20 it is possible to apply pressure from outside on the blocking part 7 so as to release this from its arresting position. The arresting position is illustrated in FIG. 4a, the displacement position in FIG. 4b. The relevant movement directions for the adjusting part 6 is illustrated by arrow 21 and for the blocking part 7 by the arrow 22. The arresting position shown in FIG. 4a is retained by an elastic member, in this case a spring 23 is wedged between adjusting part 6 and blocking part 7.

The FIG. 5–10 show another height adjuster partly with modified features, partly with additional features. It comprises a guide rail 1' with fastening hook 1'a for securing to the so-called B pillar of vehicles. A recess 5 is thus delimited in the longitudinal direction by guide surfaces 1'b. The base of the adjusting part 6' is provided with an opening for receiving a threaded bush 12' which in this case is constructed as a loose lock nut. In the adjusting part 6' can be inserted for movement a blocking part 7'. For simpler unlocking the arms 7'b of this are slightly bevelled. Otherwise a pressure spring 23 in turn ensures that the blocking part 7' is moved into the arresting position.

The adjusting part 6' can be inserted in a plastics cage or carriage 8' which has slightly arc-shaped slide springs or slide sections 18' which in the assembled state brush over its underside. On the topside of the guide rail 1' is then located an upper part 9' which is locked together with the carriage 8', i.e. clipped together. Both the carriage 8' as well as the upper part 9' are made of plastics and ensures a light-weight and noise-exposed run of the adjusting part 6' along the metal guide rail 1'. This even more so since on the upper part 9' there are provided special guide ribs 9'b which cooperate with the guide surfaces 1'b of the guide rail 1'.

The upper part 9' has a bearing 16' for a lever 20' which through a rotary point 20'a, lugs 20'b and a working axis 20'c effects unlocking, i.e. for acting on (pressing) on the blocking part 7' situated beneath this. As a special feature, each lever 20' also has projections 20'd which are designed to if possible neutralise the forces which in the event of a crash act on the lugs 20'b and in an undesirable manner could release the blocking part 7'. The provision is made therefore that the projections 20'd are provided with so much mass that they can produce an effective counter moment effective on the other side of the rotary point 20'a.

As an additional characteristic feature the adjusting part 6' also has an additional chamber which in this case is constructed as an independent element 6" and can be connected to the adjusting part 6'. In the adjusting part chamber 6" transverse to the displacement direction is provided a continuous channel in which a spring element 24' is insertable at both ends together with pin or roller-shaped latch elements 25'. The latch elements 25' engage in groove-like impressions 26' on the inside of the arms 3' of the guide rail 1' which are so arranged that a pre-latching can take place in a possible arresting position. The adjusting part chamber 6" is arranged or to be arranged beneath the guide rail 1' and can be joined to a complimentary part 9", serving as a guide, above the guide rail 1'.

The height adjuster according to the invention is characterised by a high degree of operational safety. It slides well for adjusting and does not rattle. As a result of being made up of different parts, which are connected to each other essentially releasable, good preconditions exist also for other extreme situations, especially in the event of a head impact. The connecting points in this case act like preset breaking points and partly absorb the impact energy, thus reducing the danger of injury.

LIST OF REFERENCE SYMBOLS 1, 1' guide rail
1'a fastening hook
1'b guide surface
2 central region
3, 3' arm
4 end piece
5 recess
5a latch opening
6, 6' adjusting part
6" (adjusting part) chamber
6a edge
7, 7' blocking part
7a bracket
7b, 7'b arm, end
7c front end
8, 8' plastics cage, carriage
9, 9' (locking) plate, upper part
9" complementary part for the chamber 6"
9a latch opening
9'b guide rib
10 plastics slider
11 guide
12, 12' threaded bush
13 latching lug
14 slide spring
14a exposed end
15 slide spring
15a exposed end
16, 16' bearing
17 recess
18 slide spring
18' slide section
19 channel section
20, 20' (adjusting) lever
20'a rotary point
20'b lug
20'c working axis
20'd projection
21 arrow 1

22 arrow 1
23 pressure spring
24' spring element
25' latch element
26' impression

What is claimed is:

1. Height adjuster for safety belts in a vehicle comprising:
    a guide rail, U-shaped in cross-section, and having a central region and two outer sidewalls, the sidewalls and central region together defining an interior space, the guide rail being attachable to the vehicle, the guide rail further having an elongated opening in the central region and latch openings arranged in pairs along the central region, the central region further having inner sidewalls extending along respective side edges of the elongated opening, into the interior space, substantially parallel to the outer sidewalls such that the latch openings are disposed in the central region between the inner sidewalls and the outer sidewalls, the guide rail further having a second elongated opening, disposed on a side of the guide rail opposed to the elongated opening of the central region;
    a pair of connecting bridges, each connecting bridge extending between the two outer sidewalls and across the elongated opening in the central region;
    an adjustment carriage, displaceable in the interior space, along the guide rail and having a threaded bushing for receiving a return fixture;
    an arresting mechanism for the adjusting carriage, constructed and arranged to be disposed in the adjustment carriage and to selectively engage the guide rail latch openings in a plurality of locking positions with respect to the guide rail; and
    an elastic biasing member, constructed and arranged to bias the arresting mechanism towards the latch openings.

2. Height adjuster according to claim 1, wherein the arresting mechanism further has a central region and two arms extending transverse to the central region, each arm further including a flange extending in a direction opposite to the arms such that the central region of the bracket may be extended into the elongated opening and ends of the flanges may be extended into the latch openings.

3. Height adjuster according to claim 2, wherein the arms of the arresting mechanism act as guide surfaces engaging the side edges of the elongated opening.

4. Height adjuster according to claim 2, wherein the adjustment carriage further comprises raised edges having openings through which the arms of the arresting mechanism may project to act as guide surfaces, engaging respective surfaces of the inner sidewalls of the guide rail.

5. Height adjuster according to claim 1, wherein the elastic biasing member is a pressure spring clamped in-between the adjustment carriage and the arresting mechanism.

6. Height adjuster according to claim 1, wherein the guide rail has guide surfaces along the elongated opening and the adjustment carriage has guide ribs co-operating therewith.

7. Height adjuster according to claim 1, wherein the arresting mechanism has slightly beveled ends.

8. Height adjuster according to claim 1, wherein the the threaded bushing further comprises a loose lock nut.

9. Height adjuster according to claim 1, wherein the adjustment carriage comprises a chamber with a spring element arranged therein, latch elements operated by the spring element, which latch elements for prelatching engage on an inside of the guide rail.

10. Height adjuster according to claim 9, wherein the chamber is constructed as a separate part which is to be releasably connected to a remaining portion of the adjusting part.

11. A height adjuster according to claim 1, wherein the outer sidewalls further comprise tab extensions which extend beyond the interior space to releasably engage slots formed in a pillar of the vehicle to attach the height adjuster thereto.

12. A height adjuster according to claims 11, wherein when installed in a vehicle, the sidewalls and the central region together define a compartment within which the adjustment carriage travels within the interior space, and the pillar forms only a single wall of the compartment.

13. Height adjuster for safety belts in a vehicle comprising:
    a guide rail, U-shaped in cross-section, and having a central region and two outer sidewalls, the sidewalls and central region together defining an interior space, the guide rail being attachable to the vehicle, the guide rail further having an elongated opening in the central region and latch openings arranged in pairs along the central region, the central region further having inner sidewalls extending along respective side edges of the elongated opening, into the interior space, substantially parallel to the outer sidewalls such that the latch openings are disposed in the central region between the inner sidewalls and the outer sidewalls;
    an adjustment carriage, displaceable in the interior space, along the guide rail and having a threaded bushing for receiving a return fixture;
    an arresting mechanism for the adjusting carriage, constructed and arranged to be disposed in the adjustment carriage and to selectively engage the guide rail latch openings in a plurality of locking positions with respect to the guide rail; and
    an elastic biasing member, constructed and arranged to bias the arresting mechanism towards the latch openings,
    wherein the adjusting part and the blocking part are inserted in a carriage like plastic cage which is closed by an upper part, resting against the outside of the guide rail, in the manner of a locking plate, wherein the upper part is releasably connected to the plastics cage.

14. Height adjuster according to claims 13, wherein the plastic cage and the upper part have clip connections formed of latching lugs and recesses.

15. Height adjuster according to claim 13, wherein the locking plate slides over the central region of the guide rail and itself has at least one pair of matching latch openings into which, in the arresting position, locking projections of the arresting mechanism may project.

16. Height adjuster according to claim 13, wherein the plastic cage has slide springs molded to surfaces which slide over inner sides of the sidewalls of the guide rail.

17. Height adjuster according to claim 16, wherein the slide springs are oppositely arranged in the plastics cage and have exposed ends which point in opposite directions.

18. Height adjuster according to claim 13, wherein a bearing for an adjusting lever is molded to a top end of the plastic cage.

19. Height adjuster according to claim 13, wherein between the guide rail and the upper plate is arranged a plastic slide which is substantially adapted to the shape of the upper plate.

20. Height adjuster according to claim 19, wherein proximate the arresting mechanism a channel section is molded to the plastic slide for guiding the arresting mechanism.

21. Height adjuster according to claim 19, wherein the plastic slide has slide springs molded thereto which are active between the guide rail and the upper plate.

22. Height adjuster for safety belts in a vehicle comprising:

a guide rail, U-shaped in cross-section, and having a central region and two outer sidewalls, the sidewalls and central region together defining an interior space, the guide rail being attachable to the vehicle, the guide rail further having an elongated opening in the central region and latch openings arranged in pairs along the central region, the central region further having inner sidewalls extending along respective side edges of the elongated opening, into the interior space, substantially parallel to the outer sidewalls such that the latch openings are disposed in the central region between the inner sidewalls and the outer sidewalls;

an adjustment carriage, displaceable in the interior space, along the guide rail and having a threaded bushing for receiving a return fixture;

an arresting mechanism for the adjusting carriage, constructed and arranged to be disposed in the adjustment carriage and to selectively engage the guide rail latch openings in a plurality of locking positions with respect to the guide rail;

an elastic biasing member, constructed and arranged to bias the arresting mechanism towards the latch openings; and an adjusting lever carried by the adjustment carriage which adjusting lever is formed and weighted such that its mass arranged on one side of its rotary point, which in the event of a side impact acts releasably on the blocking part, is substantially compensated in its effect by molded-on projections with corresponding mass on the other side of the rotary point.

\* \* \* \* \*